United States Patent Office 3,152,168
Patented Oct. 6, 1964

3,152,168
HALOALKYL PENTAHALOPHENYL CARBONATES
John K. Fincke, San Jose, Calif., and Robert H. Mills, Webster Groves, Mo., assignors to Monsanto Company, a corporation of Delaware
No Drawing. Filed Sept. 5, 1961, Ser. No. 135,738
8 Claims. (Cl. 260—463)

This invention relates to a novel class of derivatives of pentahalophenol. More particularly, this invention is concerned with a class of new organic compounds which are haloalkyl and haloalkenyl pentahalophenyl carbonates. Such carbonates have been found to possess useful and unexpected biological activity.

The novel compounds of this invention have the formula

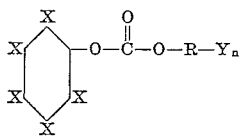

where X is selected from chlorine and bromine, Y is selected from chlorine and bromine, $n$ is an integer from 1 to 4, and R is selected from saturated acyclic hydrocarbon radicals and mono-olefinically unsaturated acyclic hydrocarbon radicals containing from 2 to 6 carbon atoms. It will be apparent that, depending upon the value of $n$, the radicals represented by R will be di, tri, tetra or pentavalent. Illustrative of such saturated and unsaturated acyclic hydrocarbon radicals are

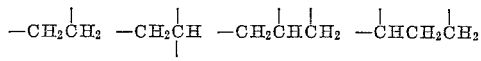

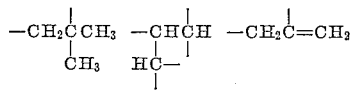

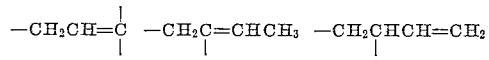

and the like. In these radicals the carbonate group is attached to the open bond on the left hand carbon atom, and each of the other open bonds will be attached to chlorine or bromine.

The novel pentahalophenol derivatives of this invention can be prepared by any one of a number of different methods. For example, an alcohol of the formula $Y_nROH$ is reacted with phosgene to form the corresponding chloroformate. The latter is then reacted with a pentahalophenate (e.g., sodium pentahalophenate) in aqueous solution to produce the desired carbonate as shown in the following equation:

(a)
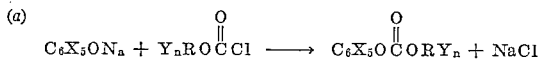

Two other methods which are employed to produce the compounds of this invention involve the reaction of a chloroformate with either an alcohol or a pentahalophenol. In each of these latter preparations it is preferred to add a tertiary amine to the reaction mixture. Such an amine serves as an acceptor for hydrogen chloride which forms during the reaction. Illustrative of the tertiary amines which can be used are trimethylamine, triethylamine, dimethylaniline, diethylaniline, pyridine, picoline, quinoline, lutidine, and the like. The reactions employing an amine acceptor are shown in the following equations:

(b)
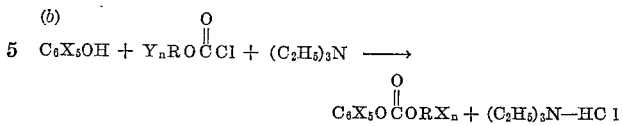

(c)
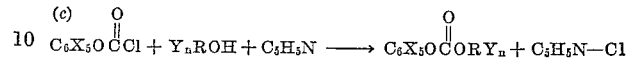

In practicing the preparations of Equations $b$ and $c$, it is also preferred to use an inert organic solvent for the pentahalo starting material. Among the suitable solvents are benzene, toluene, xylene, hexane, heptane, octane, dipropyl ether, diethyl ether, tetrahydrofuran, dioxane and the like.

It should be noted that, although both are preferred, neither the tertiary amine nor the inert organic solvent are essential to the preparation of the compounds of this invention. In the absence of such an amine, the hydrogen chloride which forms during the reaction can be boiled off.

Employing any of the above methods of preparation, the reaction temperature will depend primarily upon the particular reactants which are selected. Said temperature can vary from room temperature to the reflux temperature of the system.

The invention will be more fully understood by reference to the following examples. These examples, however, are given for the purpose of illustration only and are not to be construed as limiting the scope of the present invention in any way.

EXAMPLE I

A suitable reaction vessel is charged with 26.6 grams (0.1 mole) of pentachlorophenol dissolved in 175 ml. of toluene at 30° C. The solution is stirred while 15.7 grams (0.1 mole) of 3-chloropropyl chloroformate is added. The stirring is continued, and 10.1 grams (0.1 mole) of triethylamine in 25 ml. of toluene is added dropwise over a period of about 20 minutes. The temperature rises to 45° C. during the addition of the amine, and the mixture is then further stirred and heated to 110° C. for about 6 hours. The reaction mixture is cooled, and the amine hydrochloride which forms is filtered off and washed with toluene. The toluene is removed from the combined washings and filtrate leaving an amber colored oil. A small sample of the oil is taken up in acetone and water and chilled. A white solid is obtained, and said solid is used to seed the remaining oil which solidifies to a tan colored, oily mass. Recrystallization from Skellysolve C (an essentially n-heptane solvent having a boiling range of 86 to 100° C.) with activated charcoal yields 24.0 grams of 3-chloropropyl pentachlorophenyl carbonate as light grey crystals, M.P. 66–67° C. Analysis shows 54.9% of chlorine as against a calculated value of 54.99% for $C_{10}H_6Cl_6O_3$.

EXAMPLE II

A suitable reaction vessel is charged with 31.3 grams (0.1 mole) of sodium pentachlorophenate dissolved in 190 ml. of water. There is then added 1.0 gram of activated charcoal and 1.0 gram of dicalite speed plus. The mixture is filtered, and the filtrate is cooled to about 3° C. The mixture is stirred while 14.3 grams (0.1 mole) of 2-chloroethyl chloroformate is added dropwise over a period of 1 hour. The resulting mixture is stirred for an additional hour while the temperature rises to about 20° C. It is then filtered, washed several times with water, and dried by distillation for 30 minutes at about 95° C. with a water aspirator to give an essentially quantitative yield of crude product. It is mixed with activated charcoal oil dicalite speed plus and filtered to yield an oily product which solidifies. Said product is triturated to obtain 21.3 grams of 2-chloroethyl pentachlorophenyl carbonate as a powder, M.P. 70–76° C. Recrystallization from Skellysolve B (an essentially n-hexane solvent having a boiling range of 60–70° C.) and methylcyclohexane raised the melting point to 82–83° C. Analysis shows 57.0% of chlorine as against a calculated value of 57.06% for $C_9H_4Cl_6O_3$.

EXAMPLE III

A suitable reaction vessel is charged with 24.4 grams (0.05 mole) of pentabromophenol suspended in 175 ml. of toluene at 30° C. 7.15 grams (0.05 mole) of 2-chloroethyl chloroformate is added with stirring. The stirring is continued, and a solution of 5.1 grams (0.05 mole) of triethylamine in 25 ml. of toluene is added dropwise over a period of 20 minutes while the temperature rises to about 38° C. The mixture is then heated at 110° C. for about 6 hours. The reacted mixture is filtered to remove the amine hydrochloride which forms, and the latter is washed with toluene. The toluene is removed from the combined washings and filtrate leaving a pale yellow solid. Said solid is recrystallized from methylcyclohexane with activated charcoal, and then recrystallized again from methylcyclohexane. There is obtained 22.1 grams of 2-chloroethyl pentabromophenyl carbonate as pale yellow crystals, M.P. 130–131° C. Analysis shows 7.1% of chlorine as against a calculated value of 5.96% for

$$C_9H_4Br_5ClO_3$$

EXAMPLE IV

A suitable reaction vessel is charged with 16.4 grams (0.05 mole) of pentachlorophenyl chloroformate dissolved in 150 ml. of Skellysolve C. The solution is stirred while 7.5 grams (0.05 mole) of 2,2,2-trichloroethanol is added. The stirring is continued while 5.1 grams (0.05 mole) of triethylamine in 25 ml. of Skellysolve C is added dropwise over a period of 20 minutes. The resultant mixture is heated at reflux temperature for about 6 hours, after which it is worked up in the manner described in Example III. There is obtained 10.6 grams of 2,2,2-trichloroethyl pentachlorophenyl carbonate as white crystals, M.P. 110–111° C. Analysis shows 64.3% of chlorine as against a calculated value of 64.21% for $C_9H_2Cl_8O_3$.

EXAMPLE V

A suitable reaction vessel is charged with 16.4 grams (0.05 mole) of pentachlorophenyl chloroformate dissolved in 150 ml. of Skellysolve C. The solution is stirred while 6.3 grams (0.05 mole) of 2-bromoethanol in 50 ml. of benzene is added. The stirring is continued while 5.1 grams (0.05 mole) of triethylamine in 25 ml. of benzene is added dropwise over a period of 20 minutes. The resultant mixture is heated at reflux temperature for about 6 hours, after which it is worked up in the manner described in Example III. There is obtained 5.1 grams of 2-bromoethyl pentachlorophenyl carbonate as white crystals, M.P. 91–92° C. Analysis shows 41.9% of chlorine as against a calculated value of 42.48% for $$C_9H_4BrCl_5O_3$$

EXAMPLE VI

A suitable reaction vessel is charged with 16.4 grams (0.05 mole) of pentachlorophenyl chloroformate dissolved in 150 ml. of Skellysolve C. The solution is stirred while 5.4 grams (0.05 mole) of 4-chlorobutanol in 75 ml. of benzene is added. The stirring is continued while 5.1 grams (0.05 mole) of triethylamine in 25 ml. of benzene is added dropwise over a period of 25 minutes. The resultant mixture is stirred at room temperature for about 12 hours, and the amine hydrochloride which forms is filtered off and washed with benzene. The washings and filtrate are combined, and the solvents are removed. A pale yellow oil and a white solid material remain. After filtration through a sintered glass funnel, the filtrate is distilled. The solid residue in the distillation flask is recrystallized from Skellysolve B and activated charcoal, and recrystallized again from Skellysolve B. There is obtained 2.1 grams of 4-chlorobutyl pentachlorophenyl carbonate as white crystals, M.P. 69–70° C. Analysis shows 53.2% of chlorine as against a calculated value of 53.06% for $C_{11}H_8Cl_6O_3$.

EXAMPLE VII

A suitable reaction vessel is charged with 16.4 grams (0.05 mole) of pentachlorophenyl chloroformate dissolved in 150 ml. of Skellysolve C. The solution is stirred while 6.5 grams (0.05 mole) of 2,3-dichloropropanol in 50 ml. of benzene is added. The stirring is continued while 5.1 grams (0.05 mole) of triethylamine in 25 ml. of Skellysolve C is added dropwise over a period of 30 minutes. The resultant mixture is heated at reflux temperature for about 6 hours, after which it is worked up in the manner described in Example III. There is obtained 3.4 grams of 2,3-dichloropropyl pentachlorophenyl carbonate as a white solid, M.P. 75–77° C. Analysis shows 58.6% of chlorine as against a calculated value of 58.91% for $C_{10}H_5Cl_7O_3$.

EXAMPLE VIII

A suitable reaction vessel is charged with 16.4 grams (0.05 mole) of pentachlorophenyl chloroformate dissolved in 150 ml. of anhydrous ether. The solution is stirred while 4.7 grams (0.05 mole) of 1-chloro-2-propanol is added. The stirring is continued while a solution of 4.0 grams (0.05 mole) of pyridine in 25 ml. of ether is added dropwise over a period of 20 minutes. The resultant mixture is heated to about 35° C. and stirred at that temperature for 6 hours. It is then worked up in the manner described in Example III except that the recrystallization is from pentane. There is obtained 3.2 grams of 1-(chloromethyl)ethyl pentachlorophenyl carbonate as white crystals, M.P. 64–65° C. Analysis shows 55.1% of chlorine as against a calculated value of 54.99% for $C_{10}H_6Cl_6O_3$.

EXAMPLE IX

A suitable reaction vessel is charged with 16.4 grams (0.05 mole) of pentachlorophenyl chloroformate dissolved in 150 ml. of toluene. The solution is stirred while 6.45 grams (0.05 mole) of 1,3-dichloro-2-propanol is added. The stirring is continued while 4.0 grams (0.05 mole) of pyridine in 25 ml. of toluene is added dropwise over a period of 30 minutes. The resultant mixture is heated to 110° C. and stirred at that temperature for about 3 hours. It is then worked up in the manner described in Example VI to yield 9.1 grams of 2-chloro-1-(chloromethyl)ethyl pentachlorophenyl carbonate as white crystals, M.P. 122–123° C. Analysis shows 58.8% of chlorine as against a calculated value of 58.91% for $C_{10}H_5Cl_7O_3$.

EXAMPLE X

A suitable reaction vessel is charged with 109.6 grams (0.33 mole) of pentachlorophenyl chloroformate. There is then added 53.6 grams (0.67 mole) of 2-chloroethanol. The reactants are stirred and heated slowly to about 129° C. over a period of 2½ hours. Hydrogen chloride is evolved during most of the heating period, the rate of evolution becoming very slow at the end of said period.

The reaction mixture is then cooled and poured into water. The solid material is filtered from the water after which the former is titurated and washed with water. It is then air dried for two hours. This crude product is recrystallized twice from methanol to yield 99.9 grams of 2-chloroethyl pentachlorophenyl carbonate, M.P. 81–82° C. Analysis showed 57.0% of chlorine as against a calculated value of 57.06% for $C_9H_4Cl_6O_3$.

Following the procedures outlined in the preceding examples, the other pentahalophenyl derivatives of this invention are readily prepared. Such other derivatives include 2-bromo-1-(bromomethyl)ethyl pentachlorophenyl carbonate, 1,2,2,2-tetrachloroethyl pentachlorophenyl carbonate, 3-bromopropyl pentabromophenyl carbonate, 3,3-dichloro-2-propenyl pentachlorophenyl carbonate, 2-bromo-1,1-dimethylpropyl pentachlorophenyl carbonate, 2-chloropentyl pentabromophenyl carbonate, 1,1-dimethyl-2,2,2-trichloroethyl pentachlorophenyl carbonate, 5-bromo-1-methylpentyl pentachlorophenyl carbonate, 2-bromo-1-methylpropyl pentabromophenyl carbonate, 3-chloro-2-propenyl pentachlorophenyl carbonate, 1-dichloromethyl-1-ethylpropyl pentachlorophenyl carbonate, 2,2-dichloro-1-(dichloromethyl)ethyl pentachlorophenyl carbonate, 6-chlorohexyl pentabromophenyl carbonate, 2-chloro-3-butenyl pentachlorophenyl carbonate and the like.

As noted above, the pentahalophenyl carbonates of this invention have been found to display useful and unexpected biological activity. In this regard it should be pointed out that the chloroalkyl pentachlorophenyl carbonates are particularly preferred.

Although related compounds, such as an unsubstituted alkyl pentachlorophenyl carbonate, are known, the corresponding chloroalkyl compound demonstrates unusual superiority in its effectiveness against bacteria and fungi coupled with an unexpectedly lower toxicity. In order to illustrate these desirable features of the compounds of this invention, various tests have been made and the data obtained is hereinafter presented.

*Test A*

To show the control of bacteria, a number of cotton swatches were washed in a manner similar to a standard home washing machine cycle. A commercially available anionic laundry detergent was used in this test. Swatch No. 1 was washed with said detergent mixed with 2-chloroethyl pentachlorophenyl carbonate. Swatch No. 2 was washed with said detergent mixed with ethyl pentachlorophenyl carbonate. Swatch No. 3 was washed with the detergent alone and serves as a control.

After the washing each swatch was inoculated with $2.4 \times 10^4$ *Staphylococcus aureus* and incubated for 24 hours. The swatches were then rinsed with water, and aliquots of said water were plated out in nutrient agar. The aliquots were incubated for 48 hours, and a bacterial count was taken. The results are tabulated below:

| Swatch No. | Percent Compound in Detergent | | |
|---|---|---|---|
| | 1.0 | 0.50 | 0 |
| 1 | $1.0 \times 10^4$ | $1.3 \times 10^4$ | |
| 2 | $3.8 \times 10^4$ | $1.2 \times 10^5$ | |
| 3 | | | $1.1 \times 10^9$ |

These figures clearly show that while the number of bacteria present on Swatch No. 2 increased in each case, the compound of this invention reduced the bacterial count by at least half at both concentrations.

*Test B*

To show the control of fungi, swatches were prepared in the same manner at Nos. 1 and 2 in Test A. Each swatch was inoculated with $2.0 \times 10^4$ *Aspergillus niger* spores in 2 ml. of Sabouraud's dextrose broth. The swatches were then incubated at 28° C. for 7 days and checked for growth. The results are tabulated below:

| Swatch No. | Percent Compound in Detergent | |
|---|---|---|
| | 0.20 | 0.15 |
| 1 | No growth | No growth. |
| 2 | Growth | Growth. |

From this data it is seen that although fungus growth appears on the swatch treated with ethyl pentachlorophenyl carbonate, the compound of this invention inhibits such growth at the same concentration.

*Test C*

One of the compounds of this invention, 2-chloroethyl pentachlorophenyl carbonate, and the corresponding ethyl pentachlorophenyl carbonate were tested on rabbits to obtain data with regard to toxicity. In the skin absorption test, it was found that the 2-chloroethyl compound showed a MLD of greater than 3160 mg. 1 kg. and less than 5010 mg. 1 kg. On the other hand, the corresponding ethyl compound was found to be about three times more toxic. Further, the 2-chloroethyl compound was found to be only a slight eye irritant while the corresponding ethyl compound caused marked redness with lacrimation.

It will be obvious to those skilled in the art that many modifications and variations may be made within the scope of the present invention without departing from the spirit thereof.

The embodiments of the invention in which an exclusive property or privilege is claimed are defined as follows:

1. A compound of the formula

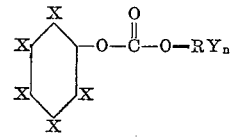

where X is selected from the group consisting of chlorine and bromine, Y is selected from the group consisting of chlorine and bromine, $n$ is an integer from 1 to 4, and R is selected from the group consisting of saturated acyclic hydrocarbon radicals and mono-olefinically unsaturated acyclic hydrocarbon radicals containing from 2 to 6 carbon atoms.

2. A compound of the formula

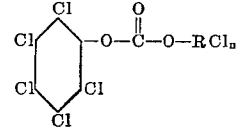

where $n$ is an integer from 1 to 4 and R is a saturated acyclic hydrocarbon radical containing from 2 to 6 carbon atoms.

3. 2-chloroethyl pentachlorophenyl carbonate.
4. 2,3-dichloropropyl pentachlorophenyl carbonate.
5. 2-chloroethyl pentabromophenyl carbonate.
6. 2-bromoethyl pentachlorophenyl carbonate.
7. 2,2,2-trichloroethyl pentachlorophenyl carbonate.
8. 3-chloropropyl pentachlorophenyl carbonate.

References Cited in the file of this patent

UNITED STATES PATENTS

| | | |
|---|---|---|
| 2,430,017 | Houk | Nov. 4, 1947 |
| 2,567,987 | Baumgartner | Sept. 18, 1951 |
| 2,787,631 | Stevens | Apr. 2, 1957 |

OTHER REFERENCES

Wagner and Zook: "Synthetic Organic Chemistry," pages 483–4 (1953).